United States Patent [19]
Schubert et al.

[11] Patent Number: 5,302,294
[45] Date of Patent: Apr. 12, 1994

[54] SEPARATION SYSTEM EMPLOYING DEGASSING SEPARATORS AND HYDROGLYCLONES

[75] Inventors: Mark F. Schubert; David A. Hadfield, both of Houston, Tex.

[73] Assignee: Conoco Specialty Products, Inc., Houston, Tex.

[21] Appl. No.: 694,723

[22] Filed: May 2, 1991

[51] Int. Cl.$^5$ ............ B01D 17/038; B01D 21/00
[52] U.S. Cl. .................. 210/702; 95/253; 96/183; 210/96.1; 210/188; 210/195.1; 210/259; 210/739; 210/788; 210/805; 210/806
[58] Field of Search ........... 166/267, 75.1; 208/184, 208/187; 210/96.1, 195.1, 197, 188, 259, 512.1, 512.2, 513, 702, 703, 704, 708, 718, 739, 740, 741, 744, 747, 787, 788, 804, 805, 806, DIG. 5; 95/243, 253; 96/182, 183

[56] References Cited

U.S. PATENT DOCUMENTS

| | | | |
|---|---|---|---|
| 3,764,008 | 10/1973 | Darley et al. | 210/806 |
| 3,802,501 | 4/1974 | Mecusker | 166/75.1 |
| 4,237,006 | 12/1980 | Colman et al. | 210/512.1 |
| 4,251,368 | 2/1981 | Colman et al. | 210/512.1 |
| 4,576,724 | 3/1986 | Colman et al. | 210/512.1 |
| 4,622,150 | 11/1986 | Carroll | 210/788 |
| 4,698,152 | 10/1987 | Carroll | 210/512.2 |
| 4,749,490 | 6/1988 | Smyth et al. | 210/512.1 |
| 4,764,287 | 8/1988 | Colman et al. | 210/512.1 |
| 4,783,272 | 11/1988 | Patterson | 210/804 |
| 5,017,288 | 5/1991 | Thew et al. | 210/512.1 |
| 5,021,165 | 6/1991 | Kalnins | 210/806 |
| 5,037,558 | 8/1991 | Kalnins | 210/806 |
| 5,093,006 | 3/1992 | Kalnins | 210/806 |

FOREIGN PATENT DOCUMENTS

| | | | |
|---|---|---|---|
| 8803841 | 6/1988 | PCT Int'l Appl. | 210/512.1 |
| 861394 | 9/1981 | U.S.S.R. | 208/187 |

*Primary Examiner*—Joseph W. Drodge

[57] ABSTRACT

A hydrocyclone separator separates an oil and water stream into an underflow stream containing primarily water and an overflow stream containing a relatively higher oil concentration than the underflow stream. Quality control of both the underflow stream and the overflow stream is of concern, and typically a de-oiling separator is placed downstream on the underflow stream, and a dewatering separator is placed downstream on the overflow stream from the hydrocyclone separator. A degassing separator is also generally utilized upstream of the inlet to the hydrocyclone separator. Various monitoring and control systems are provided for controlling the split ratio of the underflow and overflow streams of the hydrocyclone separator.

51 Claims, 10 Drawing Sheets

SEPARATION SYSTEM EMPLOYING DEGASSING SEPARATORS AND HYDROGLYCLONES

BACKGROUND OF THE INVENTION

1. Field Of The Invention

The present invention relates generally to processes and systems for separating oil, water and gas, and more particularly, but not by way of limitation, to oil well production separation systems.

2. Description Of The Prior Art

The fluid stream produced from a typical oil well is a three-phase stream containing oil, water and gas. To a lesser extent, the stream may also include solids or other contaminating fluids which are not relevant to the present invention. Conventional production fluid separation systems deliver this three-phase production stream into a three-phase gravity separator tank. A gas stream is withdrawn from the upper portion of the gravity separator tank. Oil and some water flows over a weir and is withdrawn into a conduit often referred to as an oil leg of the separator. Water with some contaminating oil remaining is withdrawn from a conduit often referred to as a water leg of the separator. One or more additional three-phase gravity separators may be placed in series with the first gravity separator with the oil leg of the first separator being directed into the second separator, and so on. The water legs of each of the gravity separators may be subjected to additional treatment to remove additional oil from the oily water discharged therefrom. De-oiling hydrocyclones are often used for further treatment of the oily water from the water leg of the gravity separators. A float tank may be used downstream of the de-oiling hydrocyclones for final degassing and further de-oiling of the water before it is discharged back to the sea. FIG. 1 of the present application depicts a typical prior art separation system of the kind just described which is currently commonly used on offshore production platforms in the North Sea. The de-oiling cyclones utilized in systems like that illustrated in FIG. 1 are designed for removal of relatively small concentrations of oil from water, and may be constructed in accordance with U.S. Pat. No. 4,576,724 to Colman et al., and U.S. Pat. No. 4,764,287 to Colman et al.

The prior art also includes hydrocyclone separators particularly adapted for removing relatively small concentrations of water from an oil stream. Such hydrocyclones are generally referred to as dewatering hydrocyclones and may for example be constructed in accordance with the teachings of U.S. Pat. No. 4,749,490 to Smyth et al.

In both de-oiling hydrocyclones and dewatering hydrocyclones, the emphasis is on the quality of one of the streams exiting the hydrocyclone.

In the case of the de-oiling hydrocyclones, the emphasis is on the quality of the water or underflow stream, and it is generally acceptable that the overflow stream will contain both oil and water. With the de-oiling hydrocyclone, the general purpose is for the water underflow stream to be sufficiently pure that it can be returned to the sea or perhaps reinjected into the formation.

With the dewatering hydrocyclones, on the other hand, the emphasis is on the quality of the overflow oil stream.

SUMMARY OF THE INVENTION

The present invention is directed toward another use for a hydrocyclone in the general context of separating oil and water in a production stream. The concept disclosed herein is that of the use of a hydrocyclone at an earlier stage of the separation process wherein additional processing of both the underflow and overflow is performed downstream of the hydrocyclone.

The present invention typically uses a hydrocyclone separator in conjunction with an initial gravity separator, or in some instances uses the hydrocyclone separator as the first separator in the production separation system, to provide some initial separation of the oil and water streams prior to further de-oiling and dewatering in other separators which may or may not be hydrocyclone separators.

Of particular significance are separator systems which are designed to be retrofit onto existing systems generally like that depicted in FIG. 1. The performance of such existing systems often degrades over time generally due to increasing water production from the formation. The addition of the hydrocyclone separator of the present invention, by reducing the volume of fluid which must be treated by the existing system, allows those systems to again perform satisfactorily thus substantially extending the life of the system and of the oil field with which it is associated.

In one aspect, the present invention is directed to a process for separating oil, water and gas contained in a production stream from an oil well. The production stream is degassed in a first separator. At least a portion of a degassed production stream from the first separator is then introduced into an inlet of a hydrocyclone separator in which it is separated into an underflow stream containing primarily water and an overflow stream containing a relatively higher oil concentration than the underflow stream. Then the overflow stream is dewatered in a third separator to reduce a water content of the overflow stream, and the underflow stream is de-oiled in a fourth separator to reduce an oil content of the underflow stream.

In one application of this system as a retrofit on an existing system like that of FIG. 1, the first separator is a two-phase gravity separator which has been obtained by modifying the existing three-phase separator. The third separator which accomplishes the dewatering is an existing three-phase gravity separator. The fourth separator which accomplishes the de-oiling is a de-oiling hydrocyclone.

In another application of this system as a retrofit on an existing system like that of FIG. 1, the first separator remains a three-phase gravity separator, and the hydrocyclone separator receives the oil leg of the first three-phase gravity separator.

In the application of the hydrocyclone separator concept of the present invention to a complete newly constructed system, all four separators are preferably hydrocyclone separators each being particularly adapted for its respective degassing, separating, de-oiling or dewatering function.

Various control systems may be associated with the hydrocyclone separator to monitor one or more of the fluid streams flowing into or out of the separator and for regulating the split ratio between the underflow stream and the overflow stream in response to that monitoring.

Additionally, in systems in which there is a relatively low percentage of gas in the production stream, the hydrocyclone separator may be used as the first separating step.

Also, in some systems, for example those wherein the underflow stream from the hydrocyclone separator is to be reinjected into the formation, there may be no need for a de-oiling separator on the underflow stream.

Numerous objects, features and advantages of the present invention will be readily apparent to those skilled in the art upon a reading of the following disclosure when taken in conjunction with the accompanying drawings.

DESCRIPTION OF THE PRIOR ART SYSTEM OF FIG. 1

Figure 1:
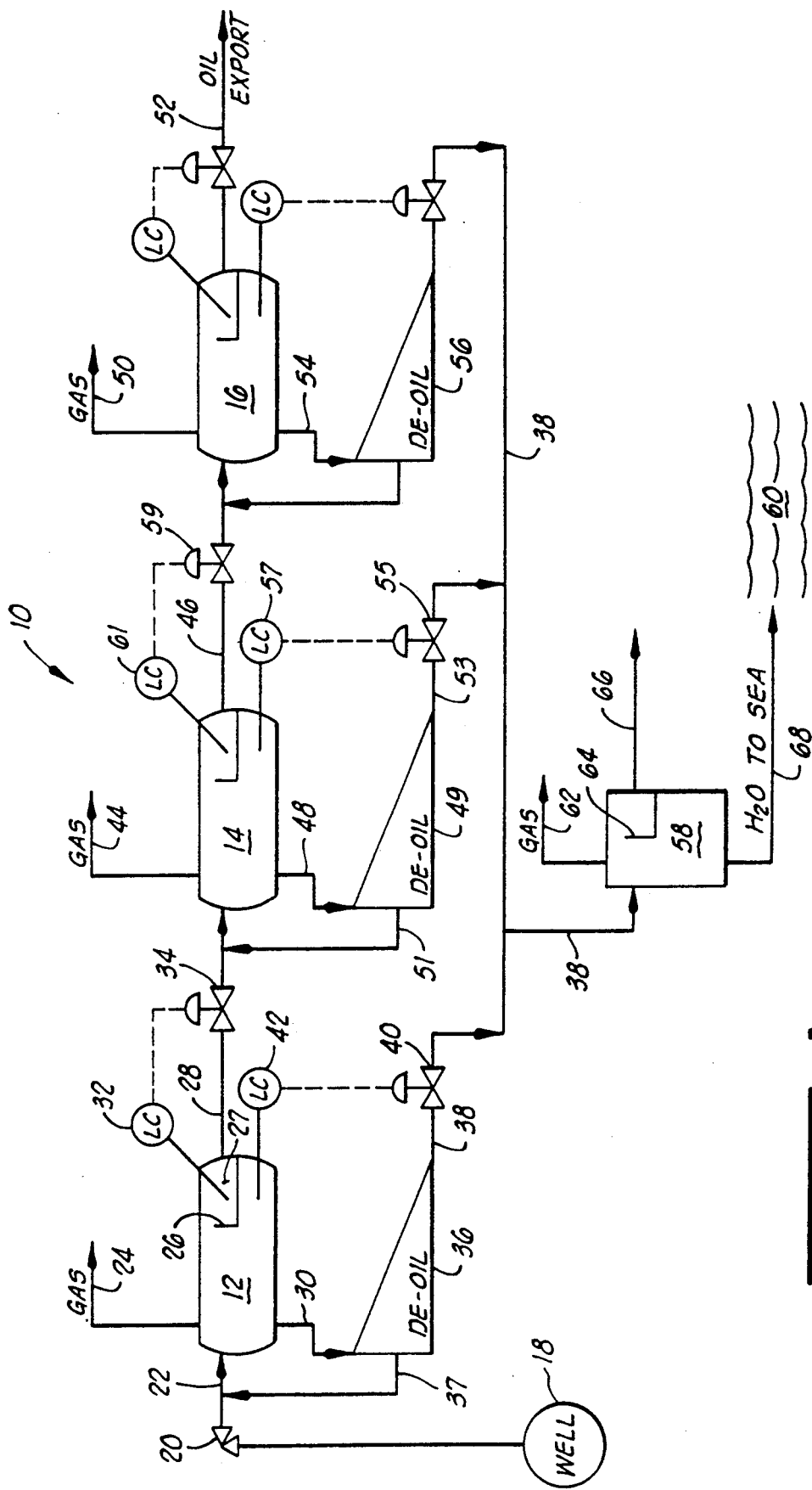
FIG. 1 is a schematic illustration of a typical existing prior art system of the type used on offshore production platforms in the North Sea. This system includes three three-phase gravity separators in series on the oil stream, with the water leg of each gravity separator being directed to separate de-oiling hydrocyclones, and with the underflow from the de-oiling hydrocyclones flowing through a flotation tank before the water is returned to the sea.

FIG. 1 schematically illustrates an oil well production separation system of the type which is currently commonly utilized on offshore production platforms in the North Sea. The separation system of FIG. 1 is shown and generally designated by the numeral 10. The system of FIG. 1 has first, second and third three-phase gravity separators 12, 14 and 16, located on a production platform (not shown) for an off-shore oil well 18.

The production stream from well 18 flows through a well head 20 and through a production line 22 into the first three-phase gravity separator vessel 12. The production stream contains water, oil and hydrocarbon gas, which subject to the influence of gravity will substantially separate in the first vessel 12 in a well-known manner. It will be understood that the production stream may contain other contaminating liquids or gases, and it may contain contaminating solids, all of which are irrelevant to the present invention, and thus the production stream may generally be referred to as a "three-phase" stream. The water and oil may be more generally referred to as a greater density first liquid component and a lesser density second liquid component, respectively. A gas stream 24 is withdrawn from the upper portion of vessel 12. Oil with some water will flow over a weir 26 into chamber 27 and out an oil leg 28. Water, which still contains some contaminating oil, is withdrawn from tank 12 through a water leg 30. A first level controller 32 monitors the level of oil and water in the chamber 27 which is communicated with the oil leg 28, and controls the position of a control valve 34 in the oil leg 28 so as to control the rate of fluid flow therethrough and thus control the level of oil and water in the chamber 27 of the first vessel 12.

The oily water which flows through the water leg 30 flows to a de-oiling hydrocyclone 36. A de-oiling overflow stream 37 from de-oiling hydrocyclone 36 is recycled to the production line 22 so that it once again goes through the first separator 12 so that further separation of the oil can occur.

An underflow stream from the de-oiling hydrocyclone 36 flows to a water discharge line 38 in which is located a second control valve 40. The control valve 40 is associated with a second level controller 42 contained on the water side of the weir 26 so as to control the level of oily water within the separator 12.

The oil leg 28 from the first separator vessel 12 is directed to the second separator vessel 14 in which it is again separated into a gas stream 44 and oil leg 46 and a water leg 48.

The water leg 48 is directed to a second de-oiling hydrocyclone 49. An overflow stream 51 from de-oiling hydrocyclone 49 is recycled to the inlet of the second gravity separator 14. An underflow 53 from de-oiling hydrocyclone 49 is connected to the discharge line 38. A control valve 55 in the underflow line 53 is controlled by a level controller 57 contained in the second gravity separator 14. A level controller 59 and control valve 61 control the flow of fluid out the oil leg 46 from second gravity separator 14.

The oil leg 46 from second vessel 14 leads to yet a third three-phase gravity separator vessel 16 which is constructed in analogous fashion to first and second vessels 12 and 14.

The third vessel 16 again separates the incoming stream into a gas stream 50, oil leg 52 and water leg 54. The oil leg 52 in this case has been processed sufficiently that it has a sufficiently small water content so that it may be directed to refining facilities and is generally referred to as the oil export line 52. The oil export stream 52 is generally required to contain less than one percent water.

The water leg 54 from third separator 16 flows through a de-oiling hydrocyclone 56 to the water discharge line 38.

The water discharge line 38 from all of the de-oiling hydrocyclones 36, 49 and 56 flows to a float tank or flotation tank 58. The flotation tank 58 is a relatively small three-phase gravity separating device which serves as the final treatment for water prior to its being discharged back into the sea 60. Flotation tank 58 has a one to two minute residence time. The flotation tank 58 separates any remaining free gas from the water discharge line 38 into a gas stream 62. A weir 64 is used to skim remaining oil from the water which is discharged through an oil line 66 which may return to some earlier stage in the treatment process. The water from flotation tank 58 is withdrawn through clean water discharge line 68 which directs it back to the sea 60. For example, in the North Sea, the discharge limit is currently based on a monthly average of less than 40 mg/l oil in water.

Typical pressures present in a system like that of FIG. 1 would be 500 psi at the inlet of separator 12, 200 psi at the inlet of separator 14, and 50 psi at the inlet of separator 16.

A system like the system 10 shown in FIG. 1 when designed for original installation will be specifically designed to accommodate the production flow rates and water concentrations expected over a substantial part of the life of the field associated with the oil well 18.

As the oil field ages, however, many things can happen which will increase the percentage of water in the production fluids and often increase the overall production fluid flow rate dramatically.

For example, in the later stages of life of a given oil field, water may be injected into surrounding wells communicated with the formation so as to drive remaining oil out of the formation to the producing wells such as well 18. In such circumstances, the total volume of fluid produced will substantially increase, and the percentage of that produced fluid which is water will go up very substantially. For example, in a typical North Sea production situation, the original production from the well may be 85% oil and 15% water. In later stages of production, when water is being injected into the field, the production fluid may be no more than about 15% oil and as much as 85% water. Typically, when the water production reaches 70-80% of the total produced fluids, conventional separation systems like that of FIG. 1 provide a bottleneck in the production system because they can no longer efficiently separate the oil and water at the flow rates at which they are being produced. In such circumstances, the only way to achieve suitable quality on the oil export line 52 and on the water discharge line 68 is to choke back the production of the well 18 which of course reduces the economic viability of the field. At some point in this process, the production of further hydrocarbons from the well 18 becomes uneconomical because of the high cost of separating those hydrocarbons from the vast amounts of water which are produced with them.

The well 18 shown in FIG. 1 is only a schematic representation. These may, of course, be a plurality of such wells, the production fluids of which are mixed prior to reaching the separation system 10.

DETAILED DESCRIPTION OF THE PREFERRED EMBODIMENTS

Figure 2:
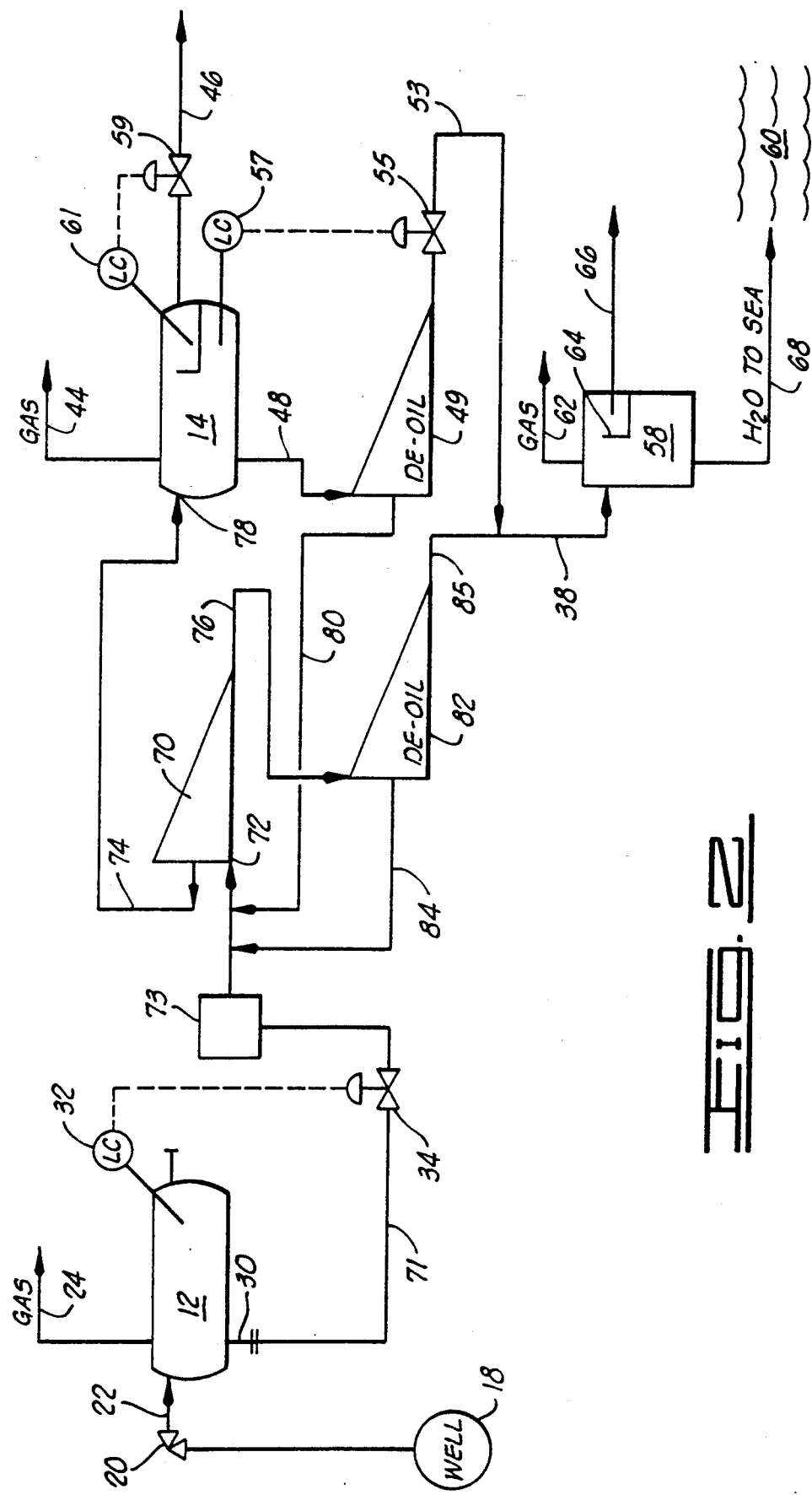
FIG. 2 is a schematic illustration of the application of the hydrocyclone separator of the present invention in a retrofit modification of an existing system like that of FIG. 1.

Retrofitting Of A Hydrocyclone Separator As Shown In FIG. 2

FIG. 2 is a schematic illustration of the retrofitting of a hydrocyclone separator in accordance with the present invention into a system like that of FIG. 1. In this embodiment the retrofitted hydrocyclone separator is usually intended to separate relatively small amounts of oil from a continuous water phase.

In FIG. 2, the first and second gravity separators 12 and 14 are shown, with a hydrocyclone separator 70 in place therebetween. The third gravity separator 16 is not illustrated, but it will be understood that it may in fact remain in place. It will also be understood that many prior art systems will only have two gravity separators such as the separators 12 and 14 as shown in FIG. 1. In any event, the present invention is applicable to retrofitting systems like that of FIG. 1 so long as they have two or more existing gravity separators such as 12 and 14.

The hydrocyclone separator 70 is placed processwise between the first and second gravity separators 12 and 14. The first gravity separator 12 is preferably converted from a three-phase separator into a two-phase separator. This is accomplished by blocking off the oil leg 28 thereof so that there is no flow through the oil leg 28. The water leg 30 is then connected to inlet 72 of hydrocyclone separator 70 by conduit 71. Control valve 34 is placed in conduit 71. A coalescing means 73, either of a mechanical nature or using chemical treatment, may be placed upstream of hydrocyclone 70. Coalescer 73 helps to bring together the dispersed phase, e.g., the oil if the fluid stream is mostly water. Also preferably the weir 26 is removed from the first separator 12 so that all of the liquids, namely oil and water, entering the first separator 12 flow out what has previously been identified as the water leg 30 therefrom. The level controller 32 will still be utilized, but it may be reset either to provide a higher liquid level in the vessel 12 to increase degassing residence time or to provide a lower level to keep the oil and water from separating and creating slugs. The gravity separator vessel 12 as modified is used only to separate gas from the oil and water. Thus substantially all of the oil and water entering the first separator 12 flow out the water leg 30 thereof and into the inlet 72 of the hydrocyclone separator 70.

It is conceivable that in some situations the first gravity separator 12 might not be changed to a two-phase separator, for example as described below with regard to FIG. 13, but most often it will be due to the desire to keep the water content of the stream entering the hydrocyclone separator 70 at a sixty percent or greater water concentration. As further described below, with the preferred geometry of hydrocyclone separator 70, it is preferred that the degassed production stream exiting water leg 30 to the hydrocyclone separator 70 have a continuous water phase and have at least a sixty percent water concentration. It is also possible to block off water leg 30 and connect oil leg 28 to inlet 72 of hydrocyclone 70.

The hydrocyclone separator 70 has an overflow stream 74 and an underflow stream 76 exiting therefrom. Overflow stream 74 may be generally referred to as a first less dense stream 74, and underflow stream 76 may be generally referred to as a first more dense stream 76, since overflow stream 74 is less dense than underflow stream 76. The overflow stream 74 is connected to an inlet 78 of the second gravity separator 14.

The preferred geometric design of the hydrocyclone separator 70, as further described below, is such that it cannot handle fluid streams containing greater than about twenty percent by volume gases, and preferably the gas content of the incoming stream is maintained at less than ten percent by volume gases. The difficulty with high free gas content is that the gas takes up such volume that the overflow stream, which has a gas core surrounded by oil, may become too large in diameter so that the oil is not able to pass through the overflow outlet.

The degassed stream of water leg 30 and conduit 71 flows into hydrocyclone 70. It will be understood that it is only the free gas which has been removed in vessel 12. Other gas still remains in dissolved form and will be released as the fluid stream experiences further pressure drops. The hydrocyclone separator 70, which may be a bank of parallel hydrocyclone separators, separates the degassed oil and water stream into an underflow stream 76 containing primarily water, i.e., more water than oil, and an overflow stream 74 which contains a relatively higher oil concentration than does the underflow stream. The choice of the number and size of hydrocyclones required will of course relate to the particular process parameters present, such as for example the differential pressure which is available to drive the separation system.

Various control systems as described below in connection with FIGS. 4, 5, 6, 7, 8 and 14 may be utilized to control the split ratio between the underflow stream 76 and overflow stream 74 so as to protect the quality of both the underflow stream and the overflow stream exiting the separator 70. Also in certain applications, a fixed split ratio may be desired.

The previously existing second gravity separator 14, which receives the overflow stream 74 from the hydrocyclone separator 70, now functions as a dewatering separator which further reduces a water content of the overflow stream 74 from hydrocyclone separator 70. The additional water which is separated in second gravity separator 14 continues to flow through the water leg 48 to the de-oiling hydrocyclone 49. The overflow from de-oiling hydrocyclone 49, now designated by numeral 80, has been rerouted to the inlet 72 of the hydrocyclone separator 70.

The addition of the hydrocyclone separator 70 cuts out a large portion of the water which was previously flowing to the second gravity separator 14, thus greatly reducing the flow rate through the second gravity separator 14 and greatly increasing the residence time therein thus increasing the separation efficiency of that separator and any further separators downstream therefrom.

The underflow stream 76 from hydrocyclone separator 70 is directed to a de-oiling hydrocyclone 82. In a retrofit situation, the de-oiling hydrocyclone previously utilized at 36 in the original arrangement of FIG. 1, may be utilized for the de-oiling hydrocyclone 82, although it need not be. The de-oiling hydrocyclone 82 reduces the oil content of the underflow stream 76 from hydrocyclone separator 70. A de-oiling overflow stream 84 from de-oiling hydrocyclone 82 is recycled to the inlet 72 of hydrocyclone separator 70. The de-oiling overflow stream 84 may be generally referred to as a second less dense stream 84, and the de-oiling underflow stream 85 may be generally referred to as a second more dense stream 85, since overflow stream 84 is less dense than underflow stream 85.

It is noted that various ones of the recycle lines such as line 84, for the systems described in this disclosure may require booster pumps therein to achieve the recycling. Such booster pumps are not illustrated herein in most instances in order to simplify the drawings.

The de-oiling hydrocyclones 49 and 82 may be constructed in accordance with the teachings of U.S. Pat. No. 4,576,724 to Colman et al., and U.S. Pat. No. 4,764,287 to Colman et al., the details of which are incorporated herein by reference.

The underflow streams 85 and 53 from the de-oiling hydrocyclones 82 and 49, respectively, are directed through discharge line 38 to the float tank 58 where final degassification and separation takes place before discharge of water to the sea.

In the prior art system of FIG. 1 as the production rate from the well 18 increases and particularly as the water concentration in the produced fluids increases and reaches a level in the range of seventy to eighty percent, a bottleneck is created. The first three-phase gravity separator 12 has the primary task in the prior art system of separating the bulk of the water from the produced fluids. Due to the decreased residence time in that tank 12 which results from increasing flow rates, the water can no longer be sufficiently separated so as provide an oil leg stream 28 which can still be adequately treated by the remaining separators 14 and 16 to provide a sufficient quality oil export 52 while still providing sufficient quality water discharge 68. When that occurs, the production rate of well 18 must be reduced.

With the modification illustrated in FIG. 2, however, wherein the first separator 12 is changed into a two-phase separator and the hydrocyclone separator 70 is added to accomplish the bulk separation of water and oil, the two-phase separator 12 and hydrocyclone separator 70 in combination provide a means for relatively rapid separation of the incoming three-phase stream 22 in comparison to the original three-phase gravity separator 12 of FIG. 1. The original three-phase gravity separator 12 of FIG. 1 would typically have a residence time on the order of five to ten minutes. The modified two-phase gravity separator 12 of FIG. 2 can operate with a residence time as low as about two minutes, because all that need take place in the gravity separator 12 of FIG. 2 is the separation of gas which is accomplished much more quickly than the separation of two liquid phases. All of the necessary liquid phase separation can occur in hydrocyclone separator 70. Thus the production rates from well 18 which can be satisfactorily separated are greatly increased.

Figure 13:
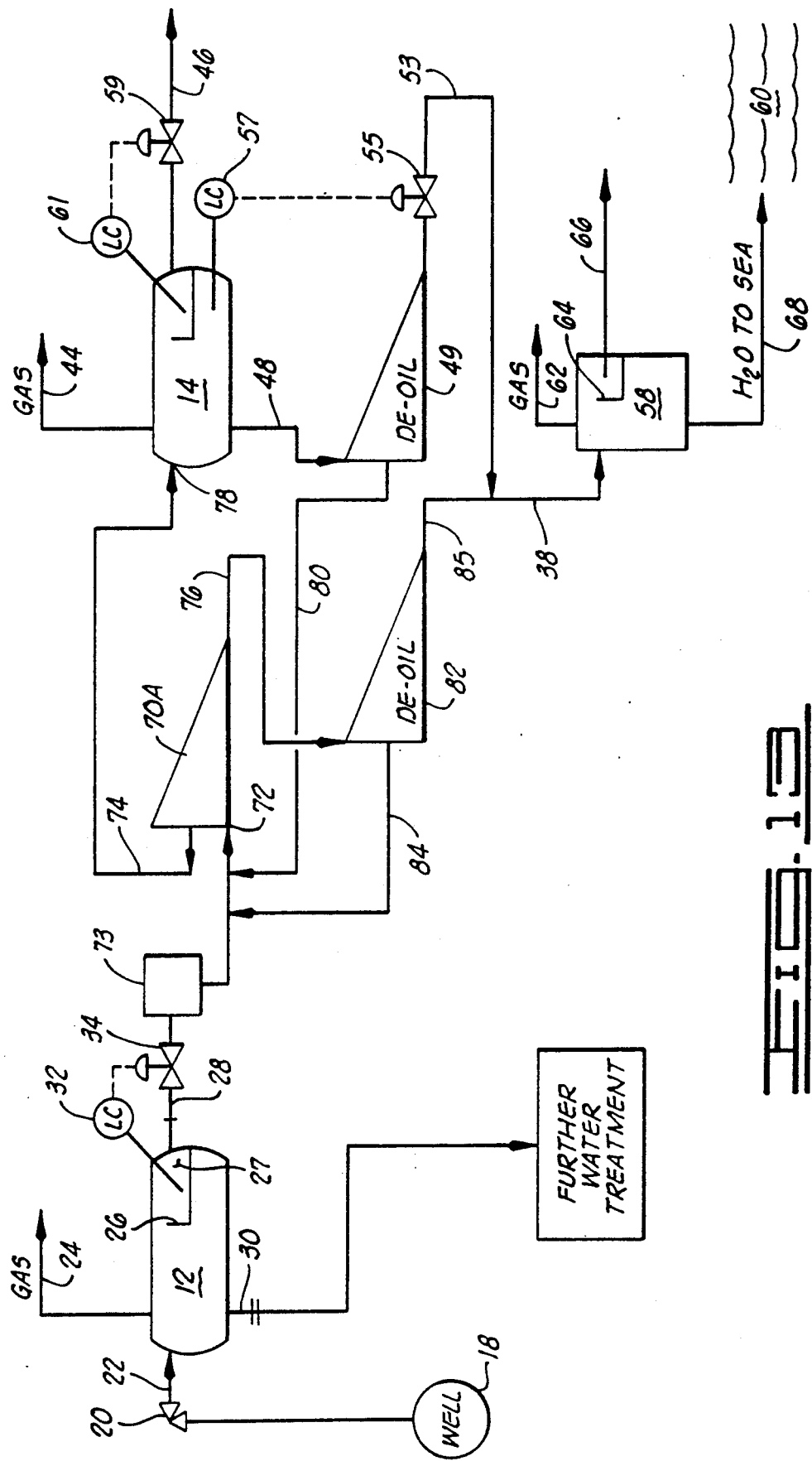
FIG. 13 is a modified version of the retrofit system of FIG. 2, wherein the first separator remains three-phase.

The Alternative Embodiment Of FIG. 13

FIG. 13 illustrates a retrofit system similar to FIG. 2, except that first separator 12 remains a three-phase separator and the hydrocyclone separator 70A receives the oil leg 28 from first separator 12. The water leg 30 goes to further water treatment which may for example be the de-oiling hydrocyclone 36 and float tank 58 previously described with regard to FIG. 1.

In this embodiment the oil leg 28 received in hydrocyclone separator 70A would generally have an oil continuous phase. Thus, the hydrocyclone separator 70A would preferably have a "dewatering" type geometry which may be constructed in accordance with the teachings of U.S. Pat. No. 4,749,490 to Smyth et al., the details of which are incorporated herein by reference.

Figure 3:
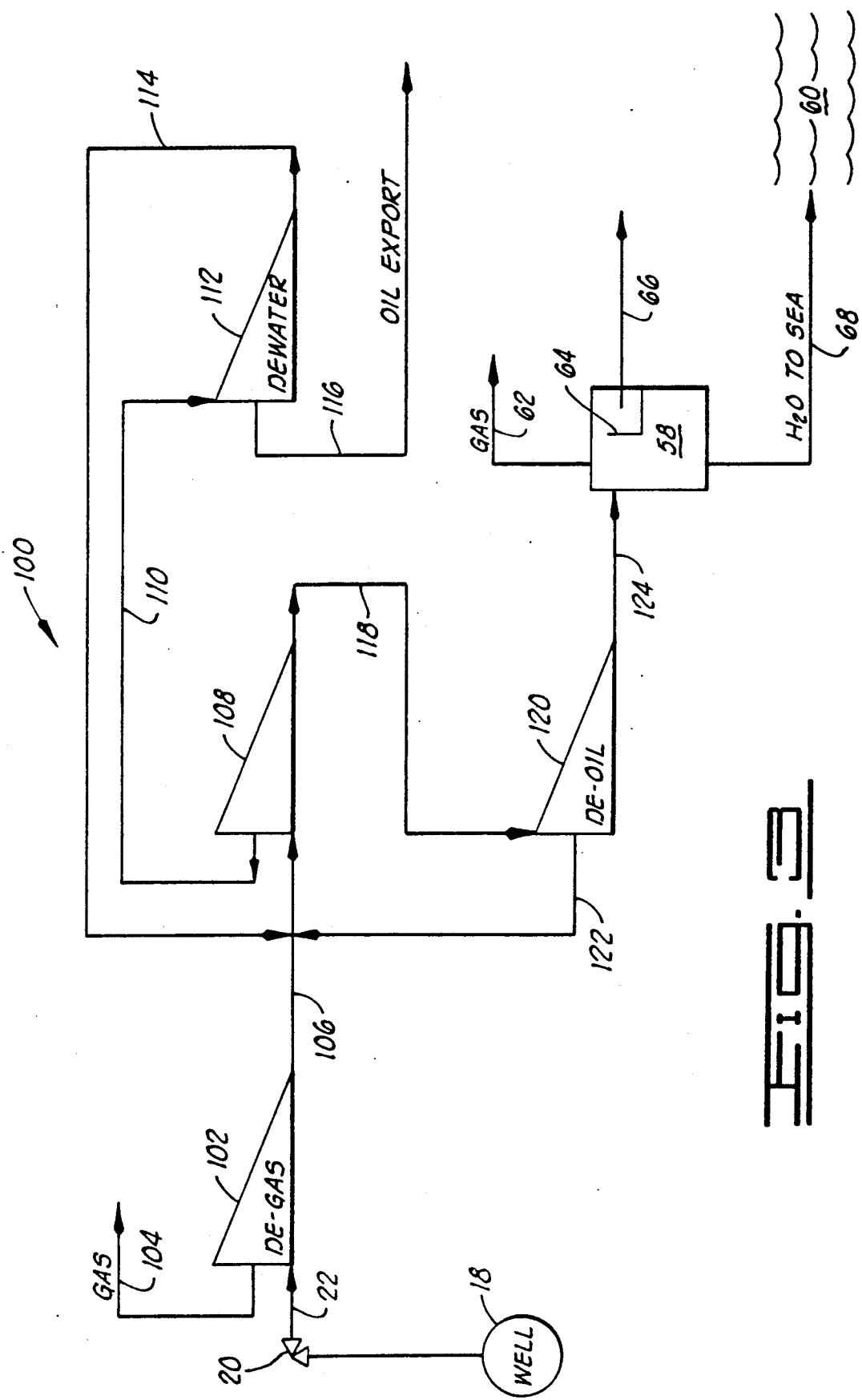
FIG. 3 is a schematic illustration of a production stream separation system of entirely new construction utilizing hydrocyclone separators for the degassing, separating, de-oiling and dewatering functions.

The Alternative Embodiment Of FIG. 3

FIG. 3 illustrates an alternative, and in some cases preferred embodiment, adapted for original construction rather than for retrofit to an existing system. The system of FIG. 3 is designed to make maximum use of the advantages presented by the use of hydrocyclone separators on offshore production platforms where space and weight are at a premium. In FIG. 3 a production separation system is shown and generally designated by the numeral 100.

The incoming production stream 22 from well 18 is directed first into a degassing hydrocyclone 102. The degassing hydrocyclone 102 may be any of several well known designs including those available from Porta-Test Co. of Houston, Tex., and those available from CE Natco under the trademark "Gasunie".

A gas stream 104 is withdrawn from the overflow of degassing hydrocyclone 102, and an underflow stream 106 containing the oil and water portion of the production stream is taken therefrom to a hydrocyclone separator 108. An overflow stream 110 from hydrocyclone separator 108 is taken to a dewatering hydrocyclone 112. The dewatering hydrocyclone 112 may be constructed in accordance with the teachings of U.S. Pat. No. 4,749,490 to Smyth et al., the details of which are incorporated herein by reference. The dewatering hydrocyclone 112 removes as much as possible of the remaining water through underflow stream 114 which is recycled to the inlet of hydrocyclone separator 108. The dewatered oil ready for oil export is contained in the overflow 116 from dewatering hydrocyclone 112.

A separator hydrocyclone underflow stream 118 is directed to a de-oiling hydrocyclone 120. A de-oiling overflow stream 122 is recycled to the inlet of separator 108. A de-oiling underflow 124 is directed to the float tank 58 which operates as previously described.

Control Systems Of FIGS. 4–8 And 14

Turning now to FIGS. 4–8 and 14, several different approaches to monitoring and controlling the split ratio between the underflow and overflow of the hydrocyclone separators 70 or 108 are schematically illustrated.

Such a monitoring and control system is generally desirable because of the constantly changing oil-to-water ratios expected in a typical production stream. If a situation is encountered where a relatively constant oil-to-water ratio is present, then there may be no need for such a monitoring and control system and the separators 70 or 108 can be provided with a fixed split ratio, such as by placing a fixed restricted orifice in the overflow.

Generally speaking, a makeup of at least one of the incoming production stream, the first underflow stream 76, the first overflow stream 74, or the second underflow stream 85 is monitored. The "makeup" of the stream refers to the relative proportions of the components of the stream, most significantly the relative proportions of oil and water, but also in some instances of significance the relative proportion of the gas content of the stream. These various control systems are illustrated as applied to either the separator 70 of FIG. 2 or 13 or the separator 108 of FIG. 3, and the numerals for the separators 70 and 108 and in some cases their corresponding inlet, overflow and underflow lines are all jointly set forth on the drawings. For ease of verbal description, the following discussion will refer only to the separator 70 and its inlet stream 28, underflow 76 and overflow 74.

Figure 4:
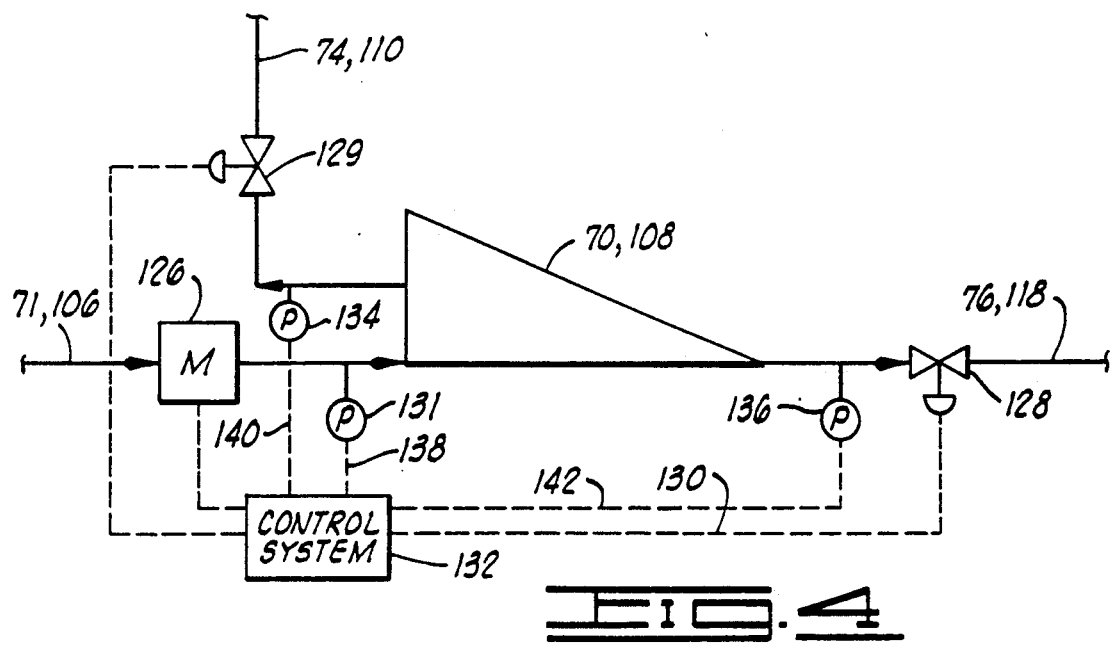
FIGS. 4, 5, 6, 7 and 8 are schematic illustrations of various alternative systems for monitoring one or more of the streams flowing into and out of the hydrocyclone separator and for controlling the split ratio between the underflow and overflow stream of the hydrocyclone separator in response to that monitoring.

FIG. 4 illustrates the monitoring of the makeup of the incoming degassed production stream 28. A monitoring means 126 is placed in the degassed production stream 28. Due to the fact that there is still some gas contained in stream 28, it is preferable that a monitoring means 126 capable of tolerating some gas content be used.

The monitoring device 126 may be an EXAC Model 8300EX mass flow meter available from EXAC Corp. of San Jose, Calif., as is further described in U.S. Pat. Nos. 4,660,421 and 4,711,132, the details of which are incorporated herein by reference.

Other monitoring devices which utilize principles of microwave, radio wave, light absorption/diffraction and acoustics are also suitable for device 126.

Based upon the incoming water-to-oil ratio monitored by the mass flow meter 126, the position of a control valve 128 connected thereto by electrical, pneumatic or hydraulic connecting means 130 and control system 132 is changed so as to control the split ratio, that is the ratio of the fluid flow rate of the underflow stream 76 to that of the overflow stream 74. Alternatively or additionally, a control valve 129 may be placed in overflow 74. Differential pressure or flow rate control could then be used to adjust the other valve's position.

The control system 132 associated with the monitoring device 126 and control valve 128 will be constructed so as to control this split ratio as desired in response to the monitored incoming water-to-oil ratio. For example, in many situations it is desirable to have a split ratio between the underflow and overflow nearly equal to the water-to-oil ratio. That is, if the monitoring device 126 determines that the incoming stream is made up of seventy percent water and thirty percent oil, the control system 132 may adjust the control valve 128 so that approximately the same 70%–30% ratio is present between the underflow stream 76 and overflow stream 74.

Although the theoretical preference is for the split ratio to be equal to the incoming fluid ratio, in reality a total separation cannot be achieved and thus the general practical preference is to operate the underflow rate at slightly less than the incoming water percentage thus pushing an excess of water to the overflow to insure a clean underflow at the expense of wetter oil. Typically the underflow ratio will be somewhere in the range of fifty to ninety percent of the inlet water percentage depending on the difficulty of separation. For situations where separation is relatively easy, the underflow rate would typically be approximately ninety percent of the incoming water percentage. For situations where separation is very difficult, the underflow rate may be as low as fifty percent of the incoming water percentage. Thus the split ratio can be said to be proportional to the incoming water percentage.

The control system 132 may also have associated therewith various means for monitoring the flow rate through the underflow stream 76 and overflow stream 74 to confirm that the desired split ratio has been achieved. For example, first, second and third pressure monitoring means 131, 134, and 136 may be connected to the inlet line 28, overflow line 74, and underflow line 76, respectively. Signals corresponding to the sensed pressure at those locations are communicated back to the control system 132 through electrical connecting means 138, 140 and 142, respectively. It will be understood by those skilled in the art that the pressure drop between 131 and 136 provides a measure of the flow rate through the underflow 76 whereas the pressure drop between 131 and 134 provides a measure of the flow rate through the overflow stream 74 for a particular hydrocyclone separator 70. Also flow meters may be used to directly measure the flow rates.

The control system 132 may be microprocessor based, but is does not have to be.

Figure 5:
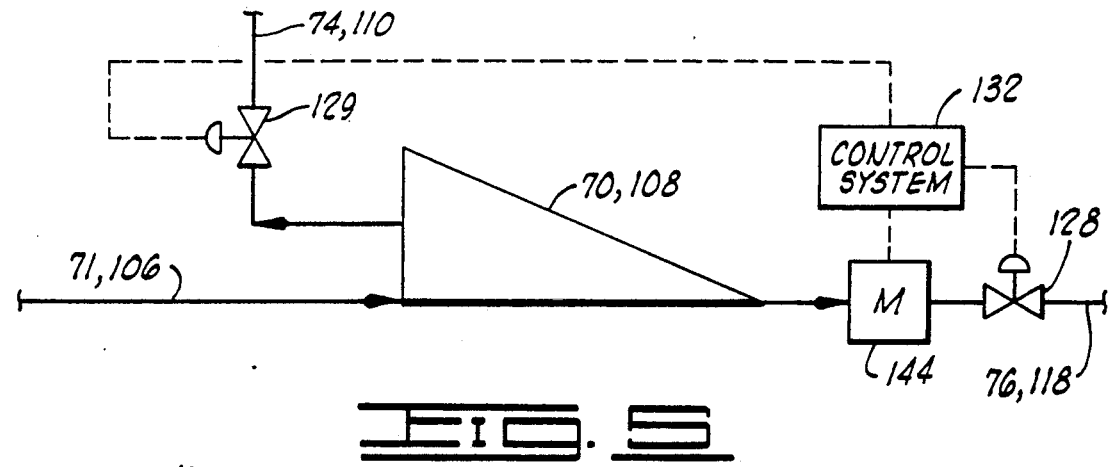

FIG. 5 illustrates an alternative control system wherein it is the makeup of the underflow stream 76 that is monitored with a monitoring device 144. Due to the much lower oil and gas concentrations present in the underflow stream 76 as compared to the inlet stream 28, the monitoring device 144 may be a turbidity meter. One suitable such monitoring device is the Optek Model No. 510E/TF10-ASA-EX available from KC Controls, Ltd. of Reigate Surrey, United Kingdom. The Optek turbidity meter is a simple optical light absorption monitor which is used to measure the quality of the underflow water stream and thus to use this variable to control the split ratio. The mass flow meter 126 and various alternative monitors described above may also be used in position 144. Monitoring of the underflow stream is simpler than monitoring of either the inlet stream 28 or overflow stream 24 as it deals with relatively low levels of oil in water, and very low levels of gas.

The turbidity meter 144 provides an indication of the concentration of oil in the oily water stream of underflow 76, as increasing oil content increases the cloudiness or turbidity of the fluid. Again, the monitoring device 144 is connected to the control system 132 which operates control valve 128. Although not illustrated in FIG. 5, the control system 132 can have associated therewith various flow rate indicating measuring devices such as the pressure monitoring devices 131, 134 and 136 illustrated in FIG. 4.

With the system of FIG. 5 wherein the turbidity meter 144 monitors the oil content of the underflow stream 76, the control system 132 controlling control valve 128 will have both an upper limit and a lower limit set therein for the oil content of the underflow stream 76. When the oil content of the underflow stream 76 exceeds the upper limit of control system 132, the control system 132 will act to reduce the opening through control valve 128 thus decreasing a percentage of the inlet stream 28 which goes to the underflow stream 76 thereby protecting the quality of the underflow stream 76 by reducing the oil content thereof. On the other hand, if the monitored oil content of the underflow stream 76 drops below a lower limit set within the control system 132, the control system 132 will cause the opening through the control valve 128 to be increased thus increasing the percentage of the inlet stream 28 which goes to the underflow stream 76 thus protecting the quality of the overflow stream 74 by reducing the water content thereof.

Typically the underflow stream from the hydrocyclone separator should contain approximately 2,000 PPM oil and the overflow stream should contain approximately twenty percent by volume water. Streams of this quality can then be adequately further dewatered or de-oiled as the case may be to provide satisfactory oil export quality and satisfactory discharge water qualities. These desired results could correspond for example to high and low limits set in control system 132 of 10,000 PPM and 300 PPM, respectively, for the underflow stream 76.

Figure 6:
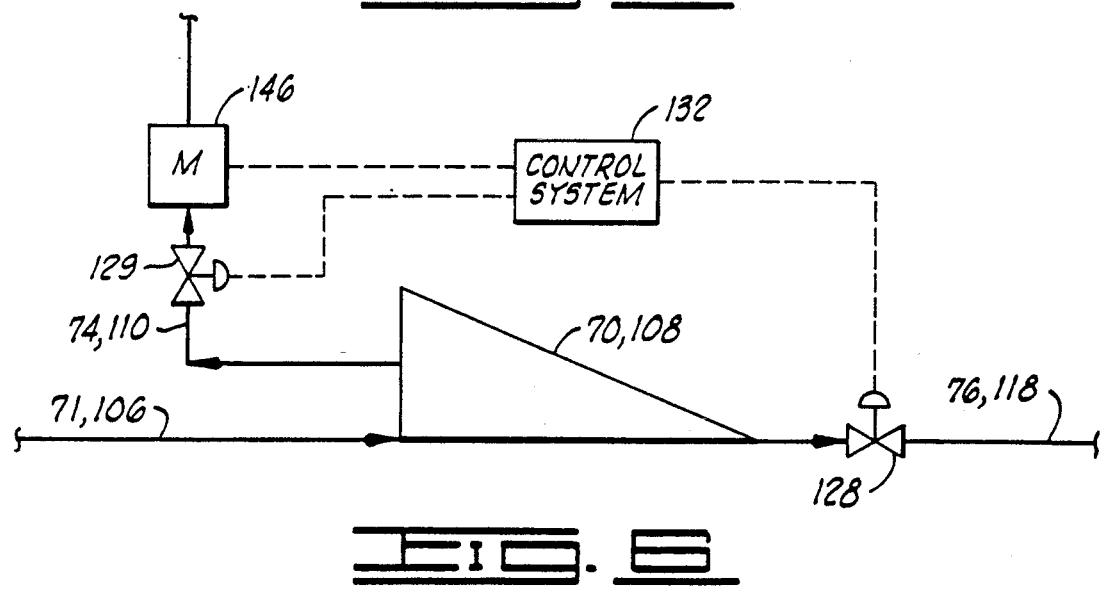

FIG. 6 illustrates yet another alternative control arrangement in which a monitoring device 146 is placed in the overflow line 74. The monitoring device 146 preferably is a mass flow meter of the same style as the meter 126 described with regard to FIG. 4. Again, monitoring device 146 is connected to a control system 132 which controls control valve 128. Again, the control system 132 may have associated therewith various pressure monitoring devices 131, 134 and 136 as illustrated in connection with FIG. 4.

Of course a control system for either of the separation systems shown in FIGS. 2 or 3 could utilize multiple monitoring devices monitoring more than one of the inlet, underflow and overflow streams of the hydrocyclone separators 70 or 108. Also, more than one control valve could be utilized, that is the additional control valve 129 could be placed in the overflow stream 74 so that one or both of the control valves were utilized to control the split ratio between the underflow stream 76 and overflow stream 74.

Figure 7:
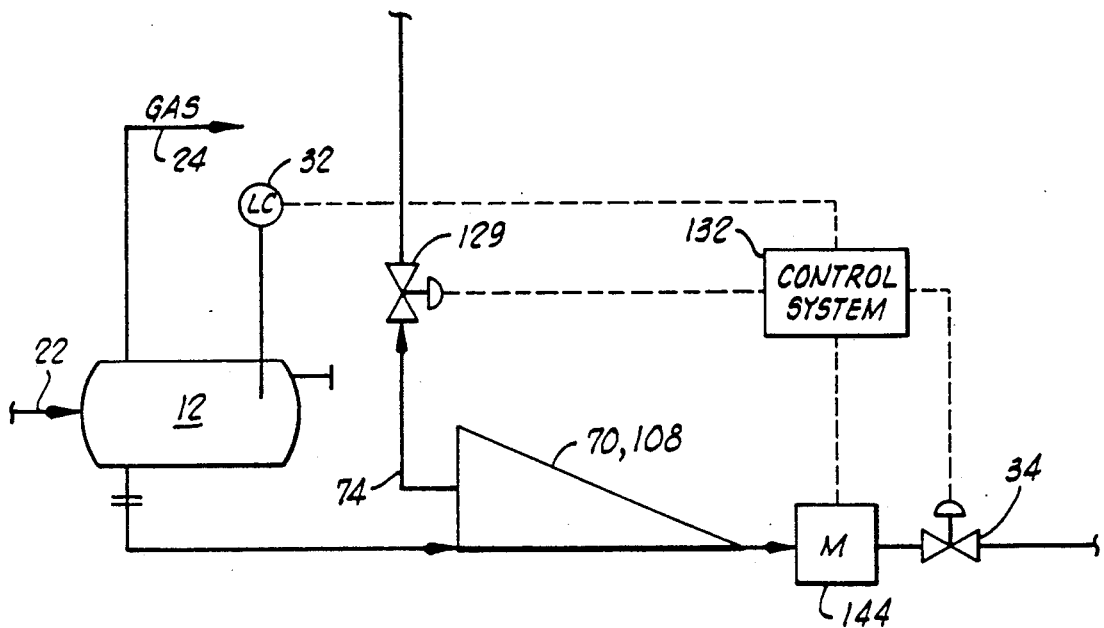

FIG. 7 illustrates yet another control arrangement. The control valve 34 associated with level controller 32 of vessel 12 is placed in the underflow stream of hydrocyclone 70 to control the flow rate through hydrocyclone 70 and thus control the liquid level in vessel 12. The control valve 129 in overflow 74 then controls the split ratio. Control system 132 controls both valves 34 and 129 in response to inputs from level controller 32 and monitor 144.

Figure 8:
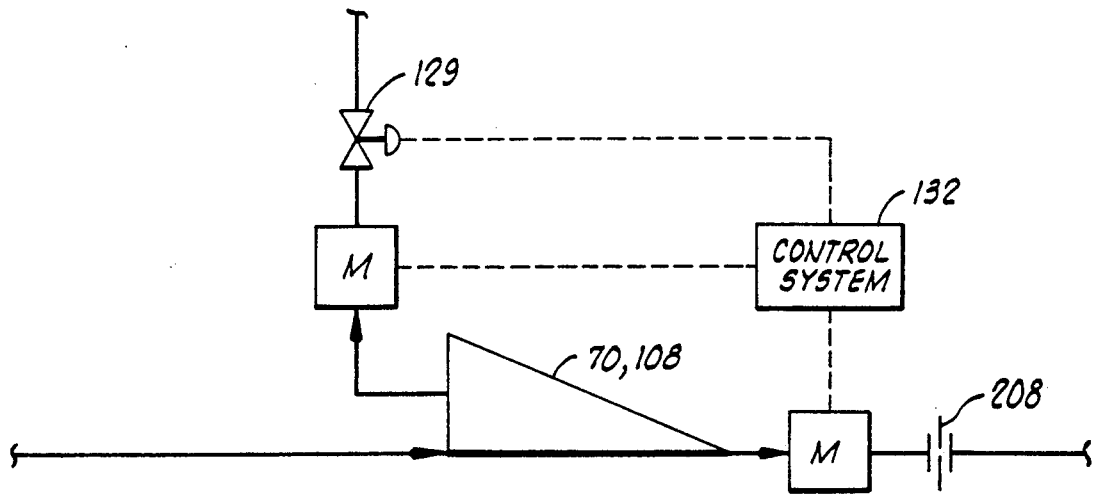

FIG. 8 illustrates the use of a fixed flow restriction 208 in the underflow, with control valve 129 on the overflow controlling the split ratio.

Figure 14:
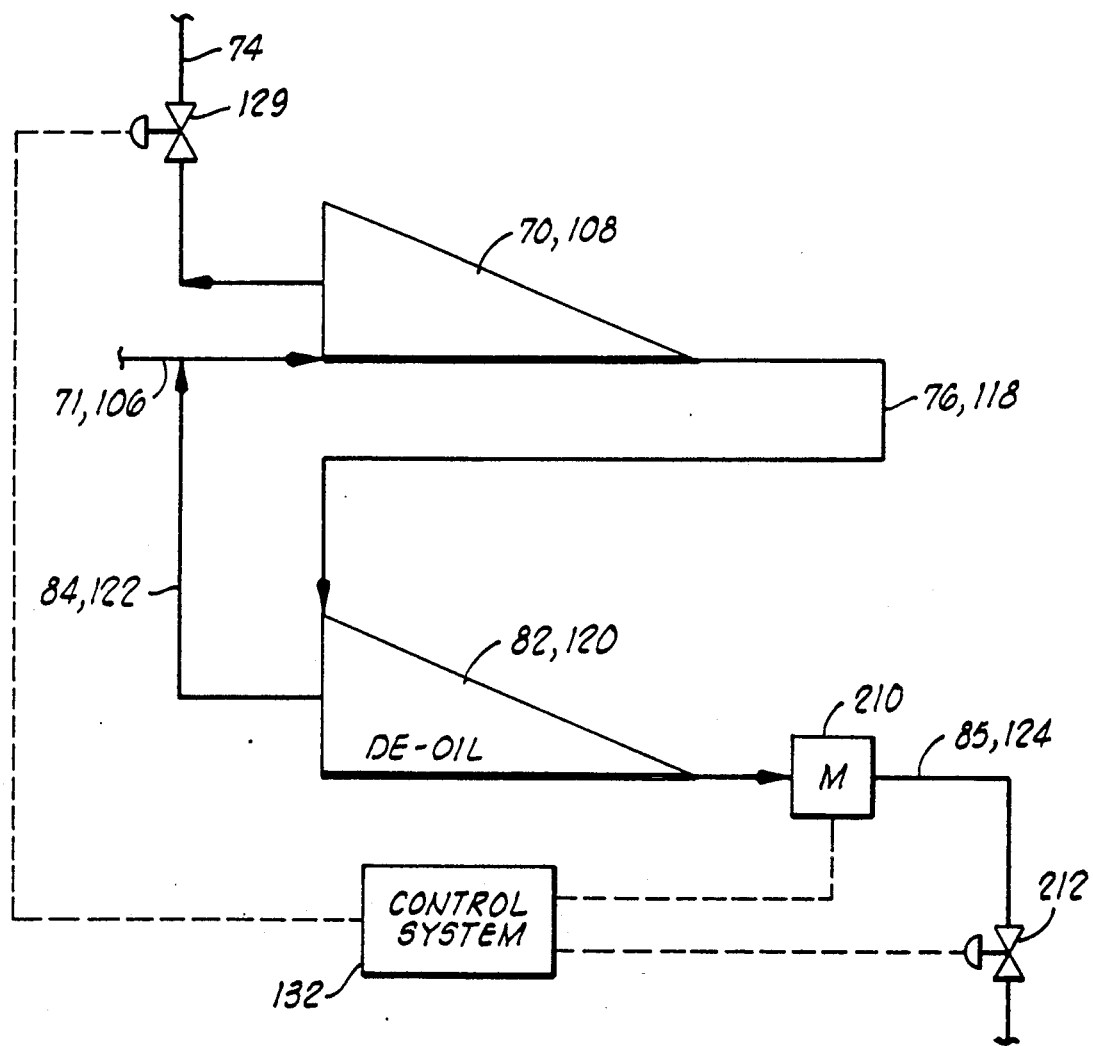
FIG. 14 is a schematic illustration of another alternative system for monitoring and control.

FIG. 14 illustrates another control arrangement wherein it is the underflow stream 85 from the de-oiling hydrocyclone 82 which is monitored. Control system 132 receives input from monitor 210 in underflow stream 85 and controls a control valve 212 in underflow stream 85 and/or control valve 129 in first overflow stream 74. Again, the control system 132 may have associated therewith various pressure monitoring devices 131, 134 and 136 as illustrated in connection with FIG. 4.

Figure 9:
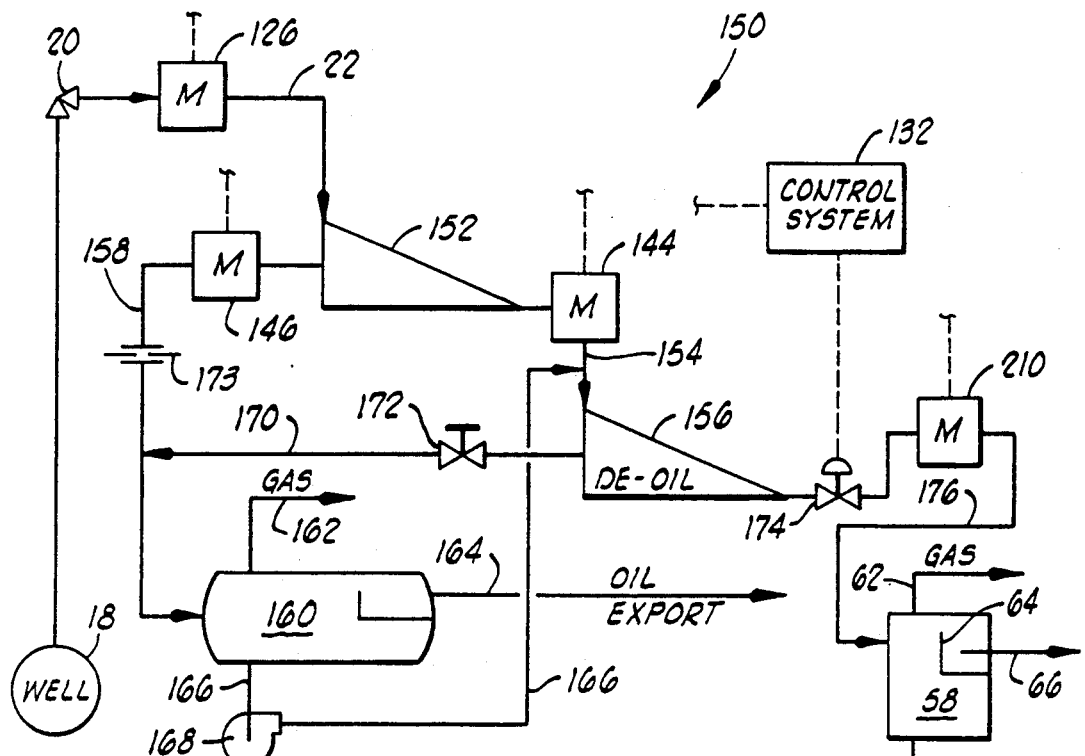
FIG. 9 is a schematic illustration of the use of a hydrocyclone separator in a system in which there is relatively low gas concentration in the production stream, so that the production stream can be introduced directly to the hydrocyclone separator without prior degassification.

The Alternative Embodiment Of FIG. 9

In the embodiments of both FIGS. 2 and 3, the hydrocyclone separators 70 and 108 disclosed therein were in association with a degassifying separator located upstream of the inlet to the hydrocyclone separator. The reason for that is that typically due to its geometry, the preferred hydrocyclone separator 70 or 108 cannot tolerate a free gas concentration of greater than about twenty percent by volume, and preferably is limited to use in situations where the gas content of the incoming stream is less than about ten percent by volume.

If the production stream from the well 18 contains very little free gas so that the free gas content thereof is less than twenty percent, then it is unnecessary to have a degassifying separator upstream of the hydrocyclone separator. Such a situation is schematically illustrated in FIG. 9 wherein a separation system is shown and generally designated by the numeral 150. The separation system 150 includes a hydrocyclone separator 152 into which the production stream 22 is directed.

An underflow stream 154 from hydrocyclone separator 152 is directed to a de-oiling hydrocyclone 156. An overflow stream 158 from hydrocyclone separator 152 is directed to the inlet of a three-phase gravity separator 160. In the gravity separator 160 a gas stream 162 is extracted as is an oil leg 164 and a water leg 166. The oil leg 164 exiting separator 160 has been dewatered in the separator 160 to a sufficient extent that it may be used for oil export to subsequent refining facilities. The water leg 166 is recycled by pump 168 to the inlet of de-oiling hydrocyclone 156, or to a separate de-oiling hydrocyclone (not shown) if required because of the pressure differential.

A de-oiling overflow line 170 from de-oiling hydrocyclone 156 is returned to the inlet of three-phase gravity separator 160.

A valve 172 in de-oiling overflow line 170 is for the purpose of adjusting a flow restriction in overflow 170 thus adjusting the percentage of the flow through de-oiling hydrocyclone 156 which goes to its overflow. The valve 172 may be manually operated or it may be an automatic control valve connected to control system 132 to automatically adjust along with valve 174. Similarly a fixed restriction orifice plate 173 is placed in the overflow 158 of separator 152. It will be understood that the overflow line from any of the hydrocyclones disclosed herein may use either a fixed or variable restriction therein to control the flow therethrough; the choice will depend upon the particular situation.

A de-oiling underflow line 176 takes water from the de-oiling hydrocyclone 156 to a flotation tank 58 generally like that previously described. An electrically operated control valve 174 is located in de-oiling underflow line 176 and is associated with a control system 132 generally like that previously described in connection with FIGS. 4-8. One or more monitoring means 126, 144, 146 and 210 as previously described may be located in the inlet 22, underflow 154, overflow 158, or underflow 176, respectively, and will be operably connected to the control system 132.

Figure 10:
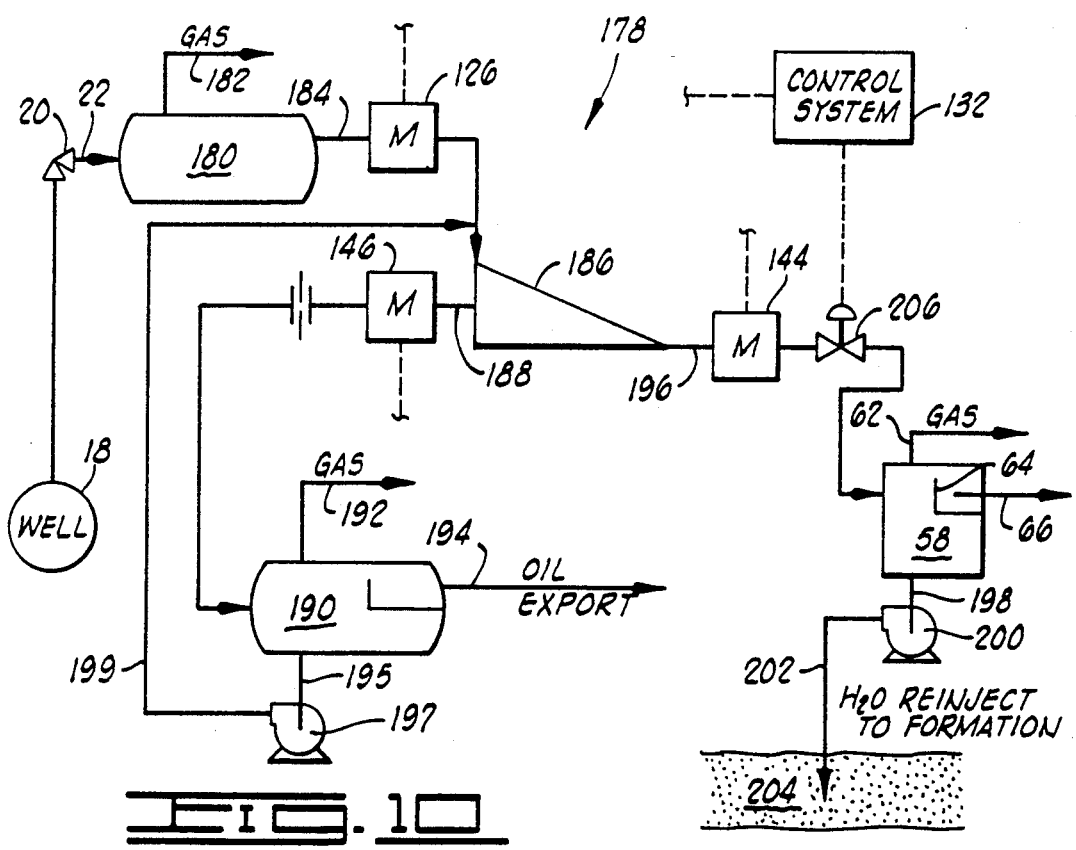
FIG. 10 is a schematic illustration of another use of the hydrocyclone separator in a system for which there is no need for subsequent de-oiling of the underflow stream from the hydrocyclone separator, such as for example in a situation where the separator underflow stream is to be reinjected back into the formation.

The Alternative Embodiment Of FIG. 10

In the separator systems previously described with regard to FIGS. 2, 3 and 9, there has always been a de-oiling separator, preferably a de-oiling hydrocyclone, downstream of the underflow of the hydrocyclone separator 70, 108 or 152. In some process situations, however, it may be that the hydrocyclone separator is capable of sufficiently cleaning the water in the underflow stream so that no further de-oiling of the underflow stream is necessary. For example, it may be that the water is going to be reinjected into the formation, and that the water exiting the underflow stream of the hydrocyclone separator will be sufficiently clean that it can be used for such injection. In such a case, the de-oiling separator on the underflow stream from the hydrocyclone separator may be eliminated.

FIG. 10 schematically illustrates just such a process in which the de-oiling hydrocyclone downstream of underflow of the hydrocyclone separator 186 has been eliminated. In FIG. 10, such a production separation system is shown and generally designated by the numeral 178.

In FIG. 10, production fluids from the well 18 flow through the production line 22 into a first two-phase gravity separator 180.

In two-phase gravity separator 180, a gas stream 182 is withdrawn, and the oil and water content of the production stream exits through line 184 to a hydrocyclone separator 186.

An overflow 188 from hydrocyclone separator 186 is directed to a second three-phase gravity separator 190. Separator 190 could also be a two-phase gravity separator. In separator 190, a second gas stream 192 is withdrawn, and an oil leg 194 contains oil suitable for oil export. A water leg 195 is recycled by pump 197 through recycle conduit 199.

An underflow stream 196 from hydrocyclone separator 186 is directed to a float tank 58 generally like that previously described. A water leg 198 from float tank 58 goes to an injection pump 200 which discharges the water down injection line 202 into a subterranean formation 204 which is communicated with the well 18 as part of a water flood injection project.

A control valve 206 is placed in the hydrocyclone separator underflow stream 196 and has associated therewith a control system 132 like that previously described. The control system 132 has associated therewith one or more of the monitoring means 146, 144 or 126 previously described.

Figure 11:
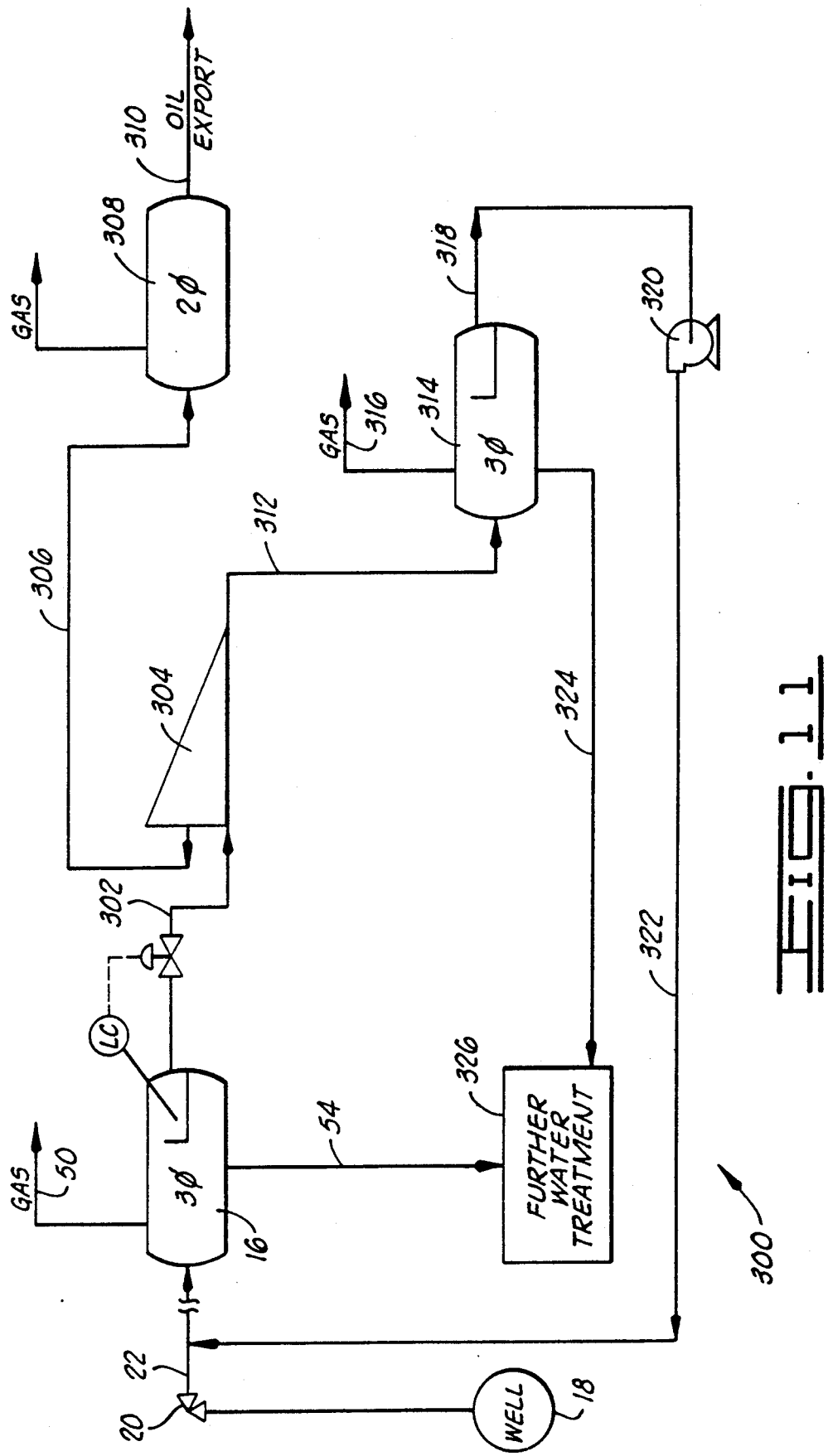
FIG. 11 is a schematic illustration of a system for treatment of a fluid stream containing predominantly oil, where relatively small proportions of water must be removed.
Figure 12:
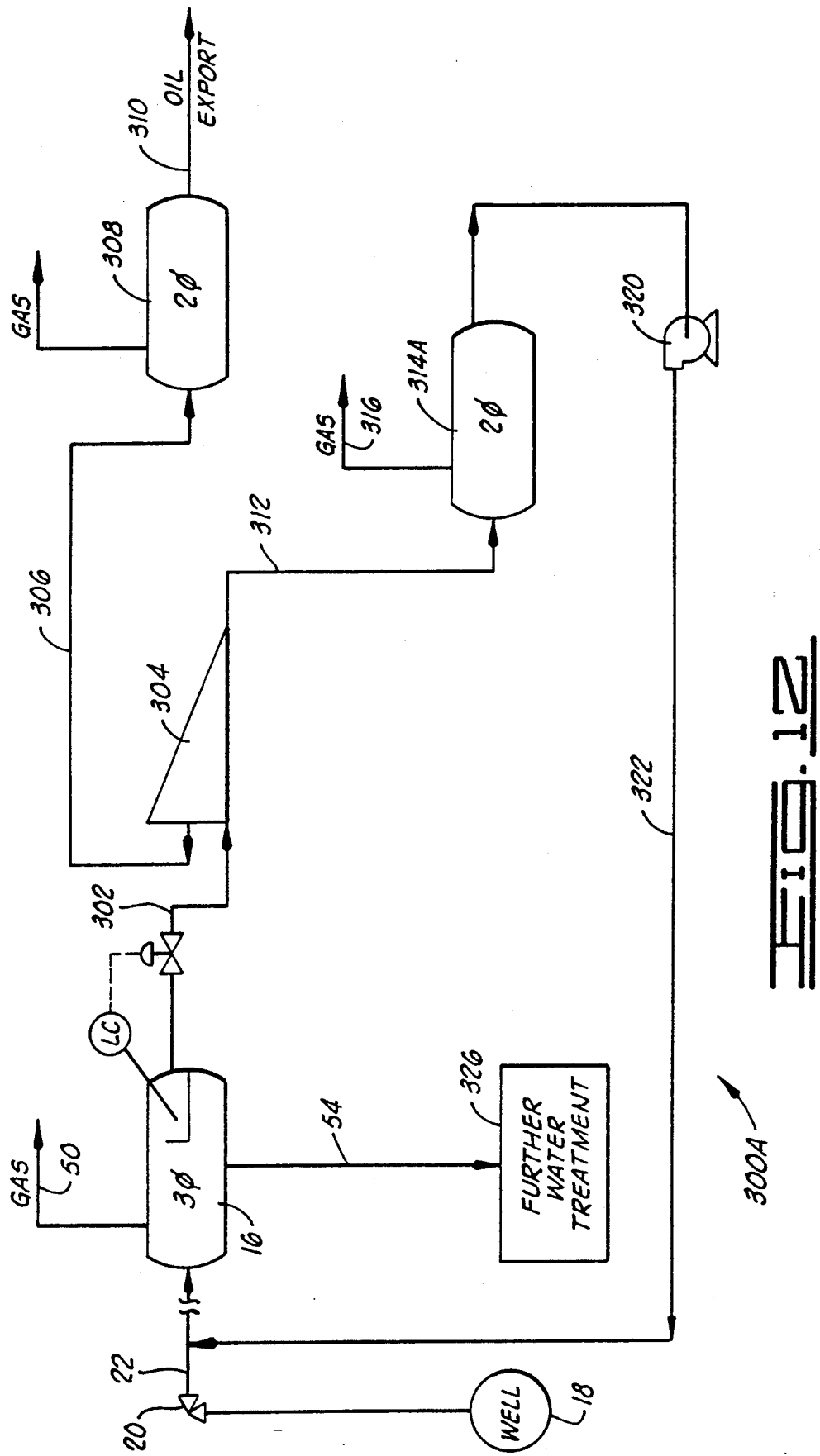
FIG. 12 is a modified version of the system of FIG. 11.

Alternative Embodiments Of FIGS. 11 And 12

FIG. 11 illustrates an alternative embodiment adapted for removal of relatively low water content from a three-phase stream containing primarily oil.

For example, referring to the prior art system of FIG. 1, it may be that additional dewatering is required after third gravity separator 16. Such a system is shown in FIG. 11 and designated by the numeral 300.

The oil leg 302 exiting vessel 16 may, for example, still contain up to ten percent water, which must be reduced to one percent in order to be suitable for oil export.

The oil leg 302 is directed into a hydrocyclone separator 304, which preferably has a "dewatering" geometry such as disclosed in U.S. Pat. No. 4,749,490 to Smyth et al. An overflow stream 306 goes through a final two-phase gravity separator 308 to remove any additional free gas released as the oil passes through hydrocyclone separator 304. The dewatered oil, with less than one percent water, then goes to the oil export stream 310.

An underflow stream 312 passes into a three-phase gravity separator 314. Additional free gas is removed at 316. An oil leg 318 of separator 314 is recycled by pump 320 through recycle conduit 322 to a point upstream of vessel 16. It will be understood that recycle conduit 322 may in fact lead to a point upstream of first gravity separator 12.

A water leg 324 of vessel 314 and the water leg 54 of vessel 16 will be routed to some further water treatment zone as generally indicated at 326. Zone 326 may be de-oiling hydrocyclones followed by a float tank as previously described.

The hydrocyclone separator 304 should have a split ratio such that a ratio of volumetric flow rate of said underflow stream 312 to overflow stream 306 is greater than a water-to-oil ratio of oil leg 302 entering hydrocyclone 304. For example, if oil leg 302 contains ten percent water, the underflow stream 312 should have a flow rate in the range of ten to twenty percent of the oil leg 302 flow rate. In some situations, this may be suitably accomplished by a fixed split ratio using a fixed orifice plate in underflow 312, or various measuring and control schemes as described above regarding FIGS. 4-8 may be used.

FIG. 12 illustrates a modified version of the system of FIG. 11 which is designated as 300A. In system 300A, the underflow stream 312 from hydrocyclone separator 304 is recycled to a point upstream of separator 16 without any further separation of water therefrom. A two-phase separator 314A may be used to remove gas from the recycled underflow 312.

Preferred Geometry For Hydrocyclone Separators

It should be emphasized that the hydrocyclone separator concept as described in this disclosure is defined in terms of the process performed by the hydrocyclone separator, not by the particular geometry of the separator. Nevertheless, preferred geometries are being disclosed for certain specific situations in which the hydrocyclone separators such as 70, 108, 152 and 186, may be utilized.

As discussed above, hydrocyclone separators of the prior art have typically been optimized for the purpose either of de-oiling in which a relatively small percentage of oil is removed from a water stream, or dewatering in which the incoming oil/water stream contains much larger concentrations of oil.

In the de-oiling hydrocyclones of the prior art exemplified by U.S. Pat. Nos. 4,576,724 and 4,764,287 each to Colman et al., the hydrocyclone is designed for a water-continuous phase with a dispersion of oil therein. With the dewatering hydrocyclones exemplified by U.S. Pat. No. 4,749,490 to Smyth et al., the incoming oil/water mixture typically contains from sixty to eighty percent oil and correspondingly from forty to twenty percent water, thus providing an oil continuous phase with water droplets dispersed therein.

The preferred hydrocyclone separator 70, 108, 152 and 186 of FIGS. 2, 3, 9 and 10, respectively, of the present invention are intended for use in situations where there typically will be a water continuous phase and wherein the oil and water mixture will contain at least sixty percent water by volume, which will insure that it is the water phase which is continuous.

At water concentrations in the range of from thirty to sixty percent, it is difficult to predict whether the water or oil will form the continuous phase of the mixture, and a phase inversion situation can be encountered which is undesirable.

If a production stream does have a water concentration in this thirty to sixty percent range, this problem can be overcome by recycling water from the underflow stream 76 of hydrocyclone separator 70 to the incoming stream 28 to the hydrocyclone separator 70 in sufficient quantities so that the fluid stream entering the hydrocyclone separator 70 will have a water content of at least sixty percent.

It has been determined that the preferred geometry for the hydrocyclone separators 70, 108, 152 and 186 of the present invention, when operating on a continuous water phase, is that generally similar to the de-oiling hydrocyclone as shown in U.S. Pat. Nos. 4,576,724 and 4,764,287, the details of which are incorporated herein by reference, except that the diameter of the overflow outlet should be increased as compared to the preferred diameters disclosed in the cited patents for the de-oiling hydrocyclones. Where, for example, the preferred de-oiling hydrocyclone geometry of U.S. Pat. No. 4,576,724 to Colman et al. has a ratio of $d_0/d_2$ of less than 0.1, the preferred hydrocyclone separator geometry would have $d_0/d_2$ greater than 0.1 and less than 0.35. Preferably no vortex finder is used on the overflow outlet.

As used in U.S. Pat. No. 4,576,724 and herein, $d_0$ refers to the diameter of the overflow outlet and $d_2$ is the diameter of the divergent end of the intermediate portion of the cyclone chamber.

Although the hydrocyclone separator concept disclosed herein has been primarily discussed in the context of separation of a production stream containing a water continuous phase and having greater than sixty percent concentration water, it will be understood that the same concept can be applied to treatment of a stream containing an oil continuous phase, such as described above regarding FIGS. 11, 12 and 13, although the preferred geometry for the hydrocyclone separator would be different. For example, if it was desired to use the separator concept to treat a stream containing eighty percent oil and twenty percent water, the hydrocyclone separator geometry should be chosen analogous to that for dewatering hydrocyclones such as shown in U.S. Pat. No. 4,749,490 which are designed to separate oil and water where there is an oil continuous phase with dispersed water contained therein.

Thus it is seen that the apparatus and methods of the present invention readily achieve the ends and advantages mentioned as well as those inherent therein. While certain preferred embodiments of the invention have been illustrated and described for purposes of the present disclosure, numerous changes may be made by those skilled in the art which changes are encompassed within the scope and spirit of the present invention as defined by the appended claims.

What is claimed is:

1. A process for separating the components of a fluid stream being substantially free of solids wherein the fluid stream comprises a majority of a greater density first liquid component, a lesser density second liquid component, and a gaseous component, comprising:
    (a) at least partially degassing said stream in a first separator to create a degassed stream comprised primarily of liquid;
    (b) introducing at least a portion of said degassed liquid stream into an inlet of a second separator, said second separator being a liquid/liquid hydrocyclone second separator of the type having an separating chamber designed, constructed and arranged for separating a mixture consisting essentially of a lighter phase liquid and a heavier phase liquid wherein the separating camber of the hydrocyclone has a ratio of length to diameter at its inlet so as to effect separation of a lighter phase liquid component of said degassed liquid stream from a heavier phase liquid component thereof;
    (c) separating said degassed liquid stream in said hydrocyclone second separator into a more dense liquid stream and a less dense liquid stream wherein each liquid stream comprises greater and lesser density liquid components and wherein said more dense liquid stream comprises a relatively lower concentration of said lesser density second liquid component compared to said degassed stream and said less dense liquid stream comprises a relatively higher concentration of said lesser density second liquid component compared to said degassed stream;
    (d) separating said less dense liquid stream into a more dense phase, a less dense phase and a gaseous phase;
    (e) introducing said more dense liquid stream into a float tank; and
    (f) reducing the content of said lesser density second liquid component of said more dense liquid stream in the float tank at least in part by gravity separation.

2. The process of claim 1, wherein:

said step (a) is further characterized in that said first separator is a two-phase gravity separator.

3. The process of claim 1, wherein:
said step (a) is further characterized in that said first separator is a three-phase gravity separator.

4. The process of claim 1, wherein:
said step (d) is further characterized in that said step of separating said less dense stream comprises separating in a three-phase gravity separator.

5. The process of claim 1, wherein:
said step (a) is further characterized in that said first separator is a gravity separator;
said step (d) is further characterized in that said third separator is a three-phase gravity separator; and.

6. The process of claim 5, wherein:
said step (a) is further characterized in that said first separator is a two-phase gravity separator.

7. The process of claim 5, wherein:
said step (a) is further characterized in that said first separator is a three-phase gravity separator.

8. The process of claim 1, wherein:
said step (b) is further characterized in that said degassed stream introduced into said hydrocyclone second separator has a continuous phase of said first liquid component.

9. The process of claim 8, wherein:
said step (b) is further characterized in that said degassed stream introduced into said hydrocyclone second separator is at least sixty percent of said first liquid component.

10. The process of claim 1, further comprising:
coalescing a dispersed phase of one of said first and second liquid components upstream of said hydrocyclone second separator.

11. The process of claim 10, wherein:
said coalescing is accomplished by chemical treatment.

12. The process of claim 10, wherein:
said coalescing is accomplished by mechanical means.

13. The process of claim 1, wherein said fluid stream is a production stream from an oil well, said first liquid component is water and said second liquid component is oil.

14. A process for separating the components of a fluid stream including a greater density first liquid component, a lesser density second liquid component, and a gaseous component, comprising:
(a) at least partially degassing said stream in a first separator to create a degassed stream;
(b) introducing at least a portion of said degassed stream into an inlet of a second separator, said second separator being a hydrocyclone second separator;
(c) separating said degassed stream in said hydrocyclone second separator into a more dense liquid stream containing a relatively lower concentration of said lesser density second liquid component and into a less dense stream containing a relatively higher concentration of said second liquid component;
(d) separating said less dense stream into a more dense phase, a less dense phase, and a gaseous phase in a third separator;
(e) reducing a second liquid component content of said more dense stream in a fourth separator;
(f) monitoring a makeup of at least one of said degassed stream, said more dense stream, said less dense stream, or a second more dense stream from said fourth separator; and
(g) controlling a split ratio between said more dense stream and said less dense stream in response to said monitoring.

15. The process of claim 14, wherein:
said monitoring step is further characterized as monitoring a makeup of said more dense stream.

16. The process of claim 14, wherein:
said monitoring step is further characterized as monitoring a second liquid component content of said more dense stream; and
said controlling step is further characterized as including:
decreasing a percentage of said degassed stream which goes to said more dense stream when said second liquid component content of said more dense stream exceeds an upper limit thereby protecting a quality of said more dense stream; and
increasing a percentage of said degassed stream which goes to said more dense stream when said second liquid component content of said more dense stream drops below a lower limit, thereby protecting a quality of said less dense stream.

17. The process of claim 14, wherein:
said monitoring step is further characterized as monitoring a density of said degassed stream.

18. The process of claim 14, wherein:
said monitoring step is further characterized as monitoring a makeup of one and only one of said streams; and
controlling a quality of both said more dense stream and said less dense stream in response to said monitoring of said one and only one of said streams.

19. The process of claim 14, wherein:
said controlling step is further characterized as controlling said split ratio between said more dense stream and said less dense stream to be proportional to a first liquid component to second liquid component ratio of said degassed stream.

20. The process of claim 14, further comprising:
monitoring a pressure drop between said degassed stream entering said inlet of said hydrocyclone second separator and at least one of said more dense stream and said less dense stream to verify that a desired split ratio has been achieved.

21. The process of claim 14, further comprising:
controlling a flow rate of said more dense stream in response to a level controller in said first separator; and
said step of controlling said split ratio is further characterized as controlling a flow restriction in said less dense stream to control said split ratio.

22. The process of claim 14, wherein:
said monitoring step is further characterized as monitoring a first liquid component to second liquid component ratio of said degassed stream; and
said controlling step is further characterized as controlling said split ratio so that a more dense stream to less dense stream ratio exceeds said first liquid component to second liquid component ratio of said degassed stream.

23. The process of claim 14, further comprising:
monitoring a flow rate between said degassed stream entering said inlet of said hydrocyclone second separator and at least one of said more dense stream and said less dense stream to verify that a desired split ratio has been achieved.

24. A system for separating the components of a fluid stream containing a greater density first liquid component, a lesser density second liquid component, and a gaseous component, comprising:

first separator means for at least partially degassing said fluid stream thereby creating a partially degassed liquid stream;

liquid/liquid hydrocyclone second separator means for receiving said at least partially degassed liquid stream from said first separator means and for separating said liquid stream into a more dense liquid stream and a less dense liquid stream, wherein said liquid/liquid hydrocyclone second separator means is of the type having a separating chamber with an inlet means for inlet of the fluid mixture to be separated, an overflow outlet means for outlet of the less dense liquid stream and an underflow outlet means for outlet of the more dense liquid stream and wherein said separating chamber has a ratio of length to diameter at said inlet means such that said hydrocyclone is designed, constructed and arranged for separating a mixture consisting essentially of a lighter phase liquid and a heavier phase liquid;

third separator means for separating said less dense liquid stream into a more dense phase, a less dense phase, and a gaseous phase; and fourth gravity separator means for reducing a second liquid component content of said more dense stream comprising a float tank and separating the more and less dense liquid components by gravity separation.

25. The system of claim 24, wherein:
said first separator means is a two-phase gravity separator.

26. The system of claim 24, wherein:
said first separator means is a three-phase gravity separator.

27. The system of claim 24, wherein:
said third separator means is a three-phase gravity separator.

28. The system of claim 24, wherein:
said first separator means is a gravity separator;
said third separator means is a three-phase gravity separator; and.

29. The system of claim 28, wherein:
said first separator means is a two-phase gravity separator.

30. The system of claim 28, wherein:
said first separator means is a three-phase gravity separator.

31. The system of claim 28, wherein:
said first separator means is a degassing hydrocyclone separator;
said third separator means is a dewatering hydrocyclone separator; and.

32. The system of claim 24, further comprising:
monitoring means for monitoring a makeup of at least one of said liquid stream, said more dense stream, said less dense stream and a second more dense stream from said fourth separator means; and
control means for controlling a split ratio between said more dense stream and said less dense stream in response to said monitoring means.

33. The system of claim 24, wherein said fluid stream is a production stream from an oil well, said first liquid component is water and said second liquid component is oil.

34. A process for separating the components of a fluid stream containing water, oil and hydrocarbon gas, comprising:

(a) separating said fluid stream in a first three-phase gravity separator into a gas stream, a water leg and an oil leg;

(b) separating said oil leg from said first three-phase gravity separator in a hydrocyclone separator into a more dense liquid stream and a less dense liquid stream, wherein the hydrocyclone is of the type which has a separating chamber having a length to diameter ratio such that it is designed, constructed and arranged for separating a mixture consisting essentially of a lighter phase liquid and a heavier phase liquid with a split ratio of a more dense stream volumetric flow rate to a less dense stream volumetric flow rate being greater than a water-to-oil ratio of said oil leg entering said hydrocyclone separator; and (c) separating at least a portion of one component of one of said more dense or less dense stream in a second additional separator downstream of said hydrocyclone separator.

35. The process of claim 34, further comprising:
further degassing said less dense stream in a two-phase gravity separator before directing said less dense stream to an oil export zone.

36. The process of claim 34, further comprising:
separating said more dense stream in a second three-phase gravity separator into a gas stream, a second water leg, and a second oil leg.

37. The process of claim 36, further comprising:
recycling said second oil leg upstream of said first three-phase gravity separator.

38. The process of claim 36, further comprising:
directing said second water leg to a further water treatment zone.

39. The process of claim 34, further comprising:
recycling said more dense stream upstream of said first three-phase gravity separator.

40. The process of claim 39, further comprising:
further degassing said more dense stream prior to said recycling.

41. A process for separating the components of a fluid stream including a greater density first liquid component, a lesser density second liquid component, and a gaseous component, comprising:

(a) introducing the fluid stream into a first separation device wherein said first separation device is a two phase separation device of the type that generally separates gas from liquid;

(b) separating the fluid stream into a gas stream and a degassed stream comprised primarily of liquid in the first separator;

(c) introducing at least a portion of said degassed liquid stream into an inlet of a second separator, said second separator being a hydrocyclone second separator of the type having a separating chamber designed, constructed and arranged for separating a mixture consisting essentially of a lighter phase liquid and a heavier phase liquid;

(d) separating said degassed liquid stream in said hydrocyclone second separator into a more dense liquid stream and a less dense liquid stream wherein each liquid stream comprises greater and lesser density liquid components and wherein said more dense liquid stream comprises a relatively lower concentration of said lesser density second liquid component compared to said degassed stream and said less dense liquid stream comprises a relatively higher concentration of said lesser density second liquid component compared to said degassed stream;

(e) introducing said less dense liquid stream into a third separator;

(f) separating said less dense liquid stream into a more dense phase, a less dense phase, and a gaseous phase in the third separator;

(g) introducing said more dense liquid stream into a fourth separator; and (h) reducing the content of said lesser density second liquid component of said more dense liquid stream in the fourth separator.

42. A process for separating the components of a fluid stream including a greater density first liquid component, a lesser density second liquid component, and a gaseous component, comprising:

(a) introducing the fluid stream into a first separation device wherein said first separation device is at least a three phase separation device of the type that generally separates gas from liquid and the liquid into at least one lighter phase liquid and a heavier phase liquid;

(b) separating the fluid stream generally into:
  a gas portion;
  at least one lighter phase liquid portion comprising mixture of lesser density second liquid component and greater density first liquid component; and
  a heavier phase liquid portion comprising more of the greater density first liquid component than the lighter phase liquid portion;

(c) introducing at least a portion of said lighter phase liquid portion from said first separation device into an inlet of a second separator, said second separator being a hydrocyclone second separator of the type having a separating chamber designed, constructed and arranged for separating a mixture consisting essentially of a lighter phase liquid and a heavier phase liquid;

(d) separating the lighter phase liquid portion in the hydrocyclone second separator into a more dense liquid stream and a less dense liquid stream wherein each liquid stream comprises greater and lesser density liquid components and wherein said more dense liquid stream comprises a relatively lower concentration of said lesser density second liquid component compared to the lighter phase liquid portion introduced into the second separator and said less dense liquid stream comprises a relatively higher concentration of said lesser density second liquid component compared to the lighter phase liquid portion;

(e) introducing said less dense liquid stream into a third separator;

(f) separating said less dense liquid stream into a more dense phase, a less dense phase, and a gaseous phase in the third separator;

(g) introducing said more dense liquid stream into a fourth separator; and (h) reducing the content of said lesser density second liquid component of said more dense liquid stream in the fourth separator.

43. A process for separating the components of a fluid stream including a greater density first liquid component, a lesser density second liquid component, and a gaseous component, comprising:

(a) at least partially degassing said stream in a first separator to create a degassed stream comprised primarily of liquid;

(b) introducing at least a portion of said degassed liquid stream into an inlet of a second separator, said second separator being a liquid/liquid hydrocyclone second separator of the type having a separating chamber designed, constructed and arranged for separating a mixture consisting essentially of a lighter phase liquid and a heavier phase liquid wherein the separating chamber of the hydrocyclone has a ratio of length to diameter at the inlet so as to effect separation of a lighter phase liquid component of said degassed liquid stream from a heavier phase liquid component thereof;

(c) separating said degassed liquid stream in said hydrocyclone second separator into a more dense liquid stream and a less dense liquid stream wherein each liquid stream comprises greater and lesser density liquid components and wherein said more dense liquid stream comprises a relatively lower concentration of said lesser density second liquid component compared to said degassed stream and said less dense liquid stream comprises a relatively higher concentration of said lesser density second liquid component compared to said degassed stream;

(d) introducing said less dense liquid stream into a third separator;

(e) separating said less dense liquid stream into a more dense phase, a less dense phase, and a gaseous phase in the third separator;

(f) introducing said more dense liquid stream being substantially free of particulate solids into a fourth separator; and (g) reducing the content of said lesser density second liquid component of said more dense liquid stream in the fourth separator.

44. A system for separating the components of a fluid stream containing a greater density first liquid component, a lesser density second liquid component, and a gaseous component, comprising:

two phase first separator means for separating the fluid stream into a first gas stream and an at least partially degassed liquid stream;

hydrocyclone second separator means for receiving said at least partially degassed liquid stream from said first separator means and for separating said liquid stream into a more dense liquid stream and a less dense liquid stream, wherein said hydrocyclone second separator means is of the type having a separating chamber with an inlet means for inlet of the fluid mixture to be separated, an overflow outlet means for outlet of the less dense liquid stream and an underflow outlet means for outlet of the more dense liquid stream and wherein said separating chamber has a ratio of length to diameter at said inlet means such that said hydrocyclone is designed, constructed and arranged for separating a mixture consisting essentially of a lighter phase liquid and a heavier phase liquid;

third separator means for separating said less dense stream into a more dense phase, a less dense phase, and a gaseous phase; and fourth separator means for reducing a second liquid component content of said more dense stream.

45. A system for separating the components of a fluid stream containing a greater density first liquid component, a lesser density second liquid component, and a gaseous component, comprising:

first separator means for separating the fluid stream into a gas stream, at least one partially degassed lighter phase liquid stream and an at least partially degassed heavy phase liquid stream;

hydrocyclone second separator means for receiving the partially degassed lighter phase liquid stream from said first separator means and for separating said liquid stream into a more dense liquid stream and a less dense liquid stream, wherein said hydrocyclone second separator means is of the type having a separating chamber with an inlet means for inlet of the fluid mixture to be separated, an overflow outlet means for outlet of the less dense liquid stream and an underflow outlet means for outlet of the more dense liquid stream and wherein said separating chamber has a ratio of length to diameter at said inlet means such that said hydrocyclone is designed, constructed and arranged for separating a mixture consisting essentially of a lighter phase liquid and a heavier phase liquid;

third separator means for reducing a first liquid component content of said less dense stream; and fourth separator means for reducing a second liquid component content of said more dense stream.

46. A system for separating the components of a fluid stream containing a greater density first liquid component, a lesser density second liquid component, and a gaseous component, comprising:

first separator means for at least partially degassing said fluid stream thereby creating a partially degassed liquid stream;

liquid/liquid hydrocyclone second separator means for receiving said at least partially degassed liquid stream from said first separator means and for separating said liquid stream into a more dense stream and a less dense stream, wherein said liquid/liquid separation means is of the type designed, constructed, and arranged to effect separation of a less dense liquid component from a more dense liquid component of an inletted fluid having a separating chamber with an inlet means for inlet of the fluid mixture to be separated, an overflow outlet means for outlet of the less dense liquid component and an underflow outlet means for outlet of the more dense component;

third separator means for separating said less dense stream into a more dense phase, a less dense phase, and a gaseous phase;

fourth separator means for reducing a second liquid component content of said more dense stream;

monitoring means for monitoring a makeup of at least one of said liquid stream, said more dense stream, said less dense stream and a second more dense stream from said fourth separator means; and control means for controlling a split ratio between said more dense stream and said less dense stream in response to said monitoring means.

47. A process for separating the components of a fluid stream containing water, oil and hydrocarbon gas, comprising:

(a) separating said fluid stream in a first three-phase gravity separator into a gas stream, a water leg and an oil leg;

(b) separating said oil leg from said first three-phase gravity separator in a hydrocyclone separator into a more dense stream and a less dense stream, a split ratio of a more dense stream volumetric flow rate to a less dense stream volumetric flow rate being greater than a water-to-oil ratio of said oil leg entering said hydrocyclone separator;

(c) separating at least a portion of one component of at least one of said more dense or less dense stream in a further separator; and (d) further degassing said less dense stream in a two-phase gravity separator, not being said further separator before directing said less dense stream to an oil export zone.

48. A process for separating the components of a fluid stream containing water, oil and hydrocarbon gas, comprising:

(a) separating said fluid stream in a first three-phase gravity separator into a gas stream, a water leg and an oil leg;

(b) separating said oil leg from said first three-phase gravity separator in a hydrocyclone separator into a more dense stream and a less dense stream, a split ratio of a more dense stream volumetric flow rate to a less dense stream volumetric flow rate being greater than a water-to-oil ratio of said oil leg entering said hydrocyclone separator;

(c) separating at least a portion of one component of at least one of said more dense or less dense stream in a further separator; and (d) separating said more dense stream in a second three-phase gravity separator, not being said further separator into a gas stream, a second water leg, and a second oil leg.

49. The process of claim 48, further comprising: recycling said second oil leg upstream of said first three-phase gravity separator.

50. The process of claim 48, further comprising: directing said first and second water legs to a further water treatment zone.

51. A process for separating the components of a fluid stream containing water, oil and hydrocarbon gas, comprising:

(a) separating said fluid stream in a first three-phase gravity separator into a gas stream, a water leg and an oil leg;

(b) separating said oil leg from said first three-phase gravity separator in a hydrocyclone separator into a more dense stream and a less dense stream, a split ratio of a more dense stream volumetric flow rate to a less dense stream volumetric flow rate being greater than a water-to-oil ratio of said oil leg entering said hydrocyclone separator;

(c) separating at least a portion of one component of at least one of said more dense or less dense stream in a further separator;

(d) recycling said more dense stream upstream of said first three-phase gravity separator; and (e) further degassing said more dense stream prior to said recycling.

* * * * *